United States Patent Office 3,414,516
Patented Dec. 3, 1968

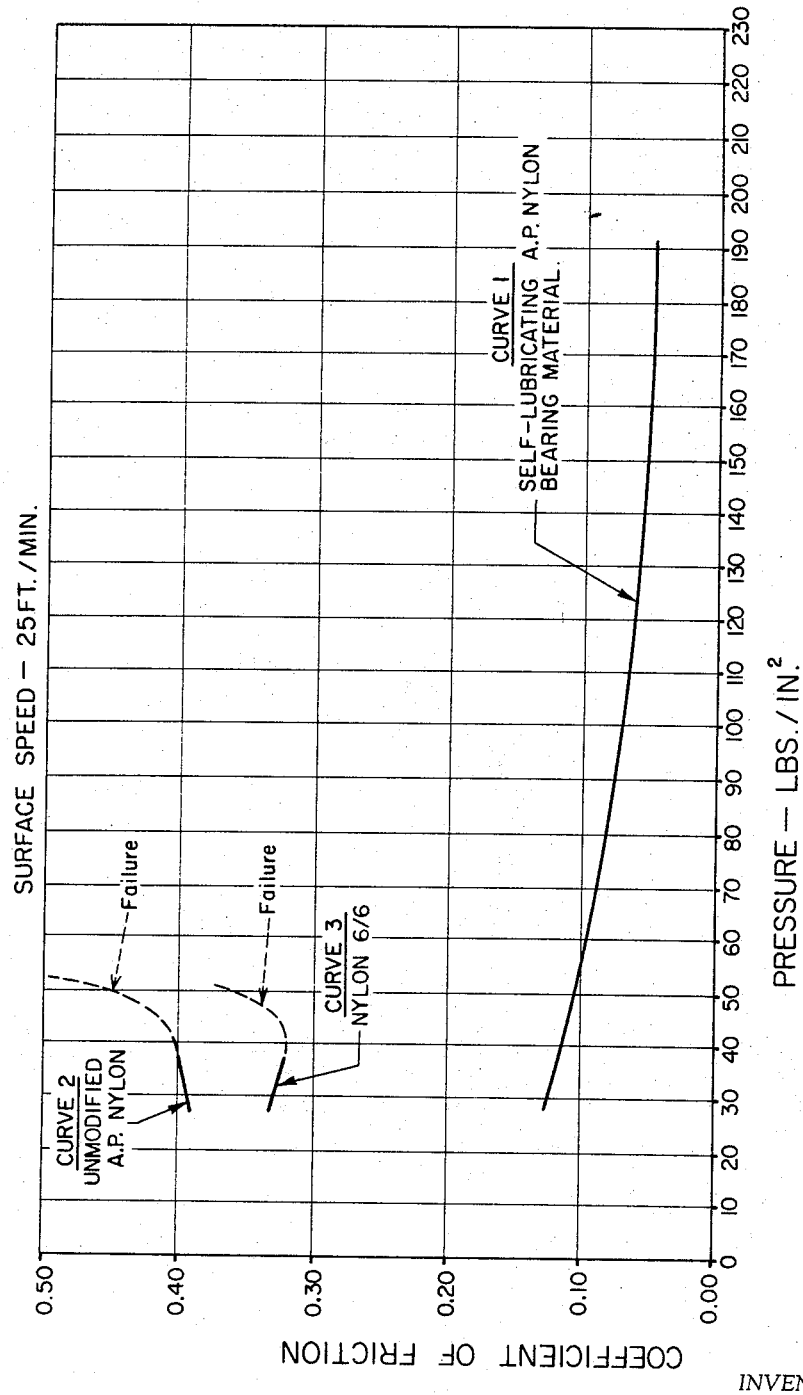

3,414,516
NYLON BEARING MATERIAL
Wilbert M. Lair and John S. Taylor, Newark, Del., assignors to The Budd Company, Philadelphia, Pa., a corporation of Pennsylvania
Continuation-in-part of application Ser. No. 463,565, June 14, 1965. This application May 5, 1966, Ser. No. 556,530
11 Claims. (Cl. 252—12)

ABSTRACT OF THE DISCLOSURE

A self-lubricating bearing element having a low coefficient of friction comprising a substantially non-porous load bearing body of nylon having substantially uniformly dispersed therein colloidal sized particles of a sorbent with sorbed lubricant.

---

This invention relates to novel bearing materials having a low coefficient of friction. More particularly, it concerns permanently lubricated nylon bearings. This application is a continuation-in-part of application Serial No. 463,565 filed June 14, 1965, now abandoned.

The term "nylon" as used in this specification and appended claims is intended to be generic to any long-chain polymeric amide which has reoccurring amide groups —CONH— as an integral part of the main polymer chain.

Nylon possesses a unique combination of desirable properties such as high strength and resistance to abrasion. Unfortunately, non-lubricated nylon has a relatively high coefficient of friction in comparison with certain other plastics used for bearings. Thus, nylon bearings heretofore have been used where a relatively high coefficient of friction could be tolerated or where the nylon bearings could be lubricated. Lubricants substantially reduce the coefficient of friction of nylon, but must be constantly applied to a nylon surface to maintain a low coefficient of friction. In many applications, it is either impossible or impractical to constantly lubricate a nylon bearing surface.

Permanently lubricated bearings are highly desirable. Many attempts have been made to provide permanently lubricated nylon bearings by incorporating oil in the nylon. One attempt consisted in forming a porous bearing by sintering together nylon particles and filling the pores with oil. The resultant bearing was relatively weak structurally, and the lubricant settled and bled from the bearing. Another attempt consisted of encapsulating oil droplets in the nylon. Unfortunately, the oil formed into relatively large size, non-uniformly distributed pockets, which weakened the bearing.

In addition to the above-mentioned problems encountered in attempting to provide a permanently lubricated nylon bearing, special problems were encountered in attempting to provide such a bearing using anionically polymerized nylon, hereinafter referred to as "A.P. nylon." A.P. nylon is produced by polymerization of anhydrous monomeric cyclic lactams having 3 to 12 carbon atoms in the nucleus of the lactam ring, such as epsilon caprolactam, in the presence of strongly basic catalysts, for example alkali metals such as sodium, potassium and lithium, and alkaline earth metals, and certain derivatives of such metals, for example lithium hydride, alkali metal alkyls, etc., at elevated temperatures in the presence of a promoter. When the lubricating oil was added to the monomer, heretofore it was not possible to prevent a major portion of the lubricant from separating from the monomer. As the polymerization progresses additional quantities of oil separated. Thus, substantial amounts of a lubricant could not be satisfactorily incorporated into A.P. nylon before the present invention.

An object of this invention is to provide nylon with improved anti-friction properties.

A further object of this invention is to provide a process for producing permanently lubricated nylon.

Another object of this invention is to provide permanently lubricated, substantially non-porous nylon bearings having a low coefficient of friction and high strength.

Still another object of this invention is to provide A.P. nylon articles having incorporated therein a lubricant in amounts and in a form to provide permanent lubrication.

A still further object of this invention is to provide a novel nylon bearing which is permanently lubricated to maintain a low coefficient of friction even under a relatively high dynamic load.

Another object of this invention is to provide nylon bearings having improved PV Values.

Other objects and advantages of this invention will become further apparent from the description and from the drawing which shows, in terms of coefficient of friction vs. pressure, a comparison of the permanently lubricated nylon of the invention and non-lubricated nylon.

Briefly, the objects of this invention are obtained by combining nylon, lubricating oil, and a finely divided sorbent, the lubricant being sorbed by the sorbent and the sorbent being uniformly dispersed throughout the nylon.

The mechanism by which the lubricating oil is associated with the sorbent is not known exactly. For this reason the mechanism is referred to herein as sorption, which includes the many phenomena commonly included under the terms adsorption and absorption. The material with which the lubricant is associated is, therefore, referred to as a sorbent. Tests suggest, however, that the mechanism is primarily adsorption. It was found that when equivalent weights of carbon blacks having different surface areas were used, the amount of oil taken up by a carbon black was proportional to its surface area, indicating that the association is primarily a surface-function, namely, adsorption. However, there is no intention to be limited by this statement because of the inability to ascertain with the necessary degree of certainty the exact mechanism of the association between lubricant and sorbent.

Various types of nylon may be used to advantage in the present invention. As stated above, these materials are synthetic linear polyamides characterized by the presence of recurring amide groups as an integral part of the main polymer chain. They may be further characterized by a high melting point and insolubility in most solvents.

Nylon suitable for use in this invention is generally one of two types, one being prepared by (1) the interaction of a diamine with at least one free hydrogen atom attached to each amino group and a dicarboxylic acid, and the other by (2) the condensation of amino carboxylic acids, their lactams or derivatives. The reaction products from (1) have the following structural arrangement:

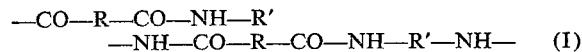
—CO—R—CO—NH—R′
—NH—CO—R—CO—NH—R′—NH—    (I)

while those from (2) have the structural arrangement:

—CO—R—NH—CO—R′—NH—CO—R—NH—    (II)

where R and R′ represent alkylene chains containing the same or different numbers of alkylene groups, generally two or more. A representative example under (1) is the reaction product of adipic acid and hexamethylene diamine. A representative example under (2) is the reaction product of the self polymerization of ε-caprolactam.

A preferred nylon for employment in this invention is A.P. nylon, which, as stated above can be prepared by the base-catalyzed polymerization of higher lactams—i.e., lactams having 3 to 12 carbon atoms in the nucleus of the lactam ring. The currently most important lactum in this category is ε-caprolactam. Other suitable higher lactams include methylcyclohexanone isoximes, cycloheptanone isoxime, cyclooctanone isoxime, cyclic hexamethylene adipamide, pyrrolidone, etc.

The anionic polymerization of higher lactams is accomplished by using various catalyst and promoter systems such as those disclosed in Belgium Patent 623,840 and in U.S. Patents 3,017,391 and 3,017,392. Although the invention is described particularly in connection with A.P. nylon formed from ε-caprolactam, it is to be understood that the invention is not limited to such A.P. nylon or to any particular polymerization process, but is applicable to various types of nylon.

In order to more clearly demonstrate the advantages of this invention reference is made to the drawing in which the ordinate represents the coefficient of friction and the abscissa the pressure applied to the nylon test piece. Curve 1 represents the results obtained with permanently lubricated A.P. nylon (polymerized epsilon caprolactam) made according to the teachings of this invention. Curve 2 represents the results obtained with the same non-lubricated A.P. nylon. Curve 3 represents the results obtained using non-lubricated polyhexamethyleneadipamide (du Pont nylon 6/6).

The values for coefficient of friction were obtained using a thrust washer-type tester set to give 25 ft. per minute average surface speed. The load on the test sample was increased in gradual increments. After each increase, the temperature change was noted. If the temperature reached equilibrium, the amount of loading was then further increased. A failure was noted when the temperature did not reach equilibrium and continued to rise until it approached the melting point of the nylon.

Under the test conditions the non-lubricated A.P. nylon (polymerized ε-caprolactam) and non-lubricated polyhexamethyleneadipamide exhibited coefficients of friction higher than that obtained with the permanently lubricated nylon of this invention. Of even greater importance, as loading was increased, the non-lubricated nylons failed but the composition of this invention did not fail even at pressures four times greater than failure pressures of the non-lubricated nylons. More specifically, the non-lubricated nylons failed when pressures between 37 and 47 p.s.i. were applied. The novel permanently lubricated A.P. nylon of this invention did not show any signs of failure when pressures in excess of 190 p.s.i. were applied. The coefficients of friction of the non-lubricated nylons at 37 p.s.i. were 0.40 and 0.325, respectively. The permanently lubricated nylon of this invention exhibited a coefficient of friction of only 0.116 at 37 p.s.i. At the greatly increased loading of 192 p.s.i., where it is impossible to use the aforementioned non-lubricated nylons, the novel permanently lubricated nylon exhibited a coefficient of friction of only 0.067.

A further advantage of the novel nylon composition of this invention is its capability for supporting high dynamic loads while maintaining a relatively low coefficient of friction.

Lubricants suitable for use in this invention are well known. The primary function of the lubricant is to lower the coefficient of friction between the nylon and the object in sliding contact with the nylon. Accordingly, the lubricant must be suitable for the particular speeds and pressures under which the bearing is to operate. An important property affecting lubricity is viscosity. In the permanently lubricated nylon bearings of this invention, lubricants have a viscosity of between about 10 and 700 centistokes at 100° F. have been found to be particularly satisfactory.

The manner of adding the lubricant and solvent to the nylon will be described in detail hereinafter, but at this time it may be noted that in one embodiment the oil and sorbent are added to molten nylon and in another embodiment the oil and sorbent are added to a monomer which is subsequently polymerized to a nylon. Accordingly, the oil must be resistant to thermal degradation and be non-volatile at the melt temperature of the nylon or the polymerization temperature of the monomer, as the case may be. The melt temperature is determined in the manufacture of the nylon and will vary according to the specifications for the particular grade of nylon. The lubricant should not vaporize at the melt temperature or polymerization temperature for the gas produced on volatilization occupies considerably more volume than the fluid, and upon condensation of the lubricant when the temperature is reduced, voids will form in the nylon.

An additional factor to be considered is the relative reactivity of the lubricant with the nylon or monomer. The oil will be in contact with the nylon or monomer at elevated temperatures and therefore the use of lubricants reactive with the nylon or monomer should be avoided. In this connection, in the A.P. nylon process lubricants containing active (—OH) groups may react with the catalyst and impair the formation of the polymer, and their use is, therefore, not recommended in such process.

The lubricant can be selected from both natural and synthetic lubricating oils and waxes. The preferred natural lubricants for employment in this invention are the hydrocarbon oils and waxes particularly those having a molecular weight from about 200 to about 1000 and about 15 to about 70 carbon atoms in their molecular structure. Such hydrocarbons may be straight chain, branched chain, or cyclic in structure. The preferred hydrocarbon lubricants are the straight and branched chain paraffins having a molecular weight of from about 280 to about 700. These hydrocarbon oils are preferred for most applications because of their relatively low cost, good lubricity and resistance to degradation.

Certain of the synthetic lubricants are highly desirable for use in special applications. These lubricants must meet the requirements noted above; namely, lubricity, resistance to thermal degradation, and non-volatility and non-reactivity with nylon or monomer at processing temperatures. The high molecular weight polyalkylene glycols made by the reaction of an alcohol with polymerized ethylene and propylene glycol, the synthetic esters of primary alcohols and dibasic acids, such as adipic and sebacic acid, and organic esters of phosphoric and silicic acid have been found useful and are relatively inexpensive. Two groups of special utility are the silicone oils and the halogenated hydrocarbons. Silicone oils which are linear and cyclic polymers of the formula $(-SiR_2O-)_n$ exhibit excellent thermal properties. The halogenated hydrocarbons include both the chlorinated and fluorinated hydrocarbons and exhibit excellent lubricity and stability, the fluorocarbon oils being extremely stable.

The sorbent can be any one of a considerable number of materials. The sorbent should possess certain properties such as the ability to associate with relatively large amounts of liquid lubricant to prevent the lubricant from forming into pockets. It should be resistant to thermal degradation at polymerization temperatures or the melt temperaure of the nylon. Materials which have been found to be particularly suitable for use in this invention are carbon black, silica, and silicates, such as clays of the kaolin type. A particularly useful sorbent comprises a mixture of carbon black and silica.

The sorbent should be finely divided and preferably should have a particle size which is essentially colloidal, i.e., from about 1 mμ to about 1μ, so that it can be dispersed uniformly throughout the nylon and will associate with relatively large amounts of liquid lubricant. Preferably, the sorbent should have a surface area of from about 20 to about 1200 m.²/g.; a surface area of from about 100 to about 400 m.²/g. being particularly preferred (Brunauer-Emmett-Teller method).

A preferred sorbent for utilization in this invention is a carbon black which is alkaline or neutral, and which has a particle size and surface area as specified above. In addition, the carbon black preferably should have the ability to sorb from about 20 to about 375 g. of oil per 100 g. of carbon black according to the Standard Rub-Out Method for determining oil absorption as described on page 289 of "Physical and Chemical Examination of Paints-Varnishes-Lacquers-Colors," by Henry A. Gardner and G. G. Sward, 11th ed., January 1960 (also adopted by the American Society for Testing Materials, Designation D332–31T). Preferably, the carbon black should have the ability to sorb from about 50 to about 250 g. oil per 100 g. of carbon black.

The amounts of nylon, lubricant and sorbent in the permanently lubricated nylon can be varied considerably. The most important ratio is that of sorbent to lubricant since it is the sorbent which associates with the lubricant and prevents the formation of large oil pockets. The ratio of sorbent to lubricant is dependent on the particular sorbent and lubricant employed. Some sorbents are capable of combining with greater quantities of lubricant than others, therefore less is required. With sorbents of the type described above it has been found that the weight ratio of sorbent to lubricant may be in the range between about 1:10 to 5:1, the preferred ratio being from about 1:5 to 1.5:1.

The ratio of sorbent and lubricant to nylon can be varied, and in most instances the end use of the bearing will determine how much oil and sorbent should be used. A ratio of from about 1 to about 35 parts by weight of the lubricating oil, and about 0.2 to about 50 parts of the sorbent, per 100 parts by weight of nylon has been found to provide bearing compositions suitable for most applications. Preferably, the permanently lubricated nylon of this invention comprises from about 3 to about 20 parts by weight of lubricant and from about 1 to about 20 parts sorbent per 100 parts nylon. The above proportions are especially suitable for use with A.P. nylon comprising polymerized epsilon caprolactam, carbon black sorbent, and hydrocarbon oil lubricant.

There are many ways in which the lubricant and sorbent can be combined with the nylon, different preferred techniques being used for adding lubricant to nylon and for adding lubricant to the monomer. When using nylon, the preferred technique is to initially combine the sorbent and the lubricant in a mixer capable of grinding the sorbent to form a smooth uniform homogenous mixture. If the lubricant is a wax, it should be heated to the liquid state. This mixture is then added to the molten nylon and the combination thoroughly blended. The mixture of the sorbent, lubricant and nylon is then cooled below the solidifiication temperature of the nylon. With nylon, this technique is preferred in that it is possible to prepare relatively large amounts of the sorbent and lubricant mixture beforehand, thereby providing quick cycling of the nylon materials in the molds.

One of the main advantages of the in situ anionically polymerized nylon process is that relatively large parts can be cast in place free of internal stresses and polymerized to a very high molecular weight. The freedom from internal stresses is due to the polymerization of the monomer in the desired configuration.

In the A.P. nylon process, it is essential that the lubricant be incorporated before the monomer is completely polymerized. The polymerization procedure usually involves mixing two batches of molten monomer, one containing the catalyst, which preferably has had time to react with the monomer, and the other containing the promoter. The sorbent and lubricant can be added to one or both of these molten monomer batches either prior to or subsequent to addition of catalyst and promoter. Preferably, catalyst is added to monomer subsequent to addition thereto of the oil and sorbent. The oil and sorbent can be mixed together prior to addition to the molten monomer, or mixed in the presence of the monomer. The addition of the sorbent somewhat thickens the mixture and maintains a relatively uniform dispersion of the lubricant throughout the unpolymerized material, holding it there during the polymerization process.

The following examples are illustrative of this invention; however, the invention should not be considered to be limited to the exact procedures shown in these examples.

EXAMPLE I 300 g. of a carbon black having an average particle size of 20 m$\mu$, a surface area of 140 m.$^2$/g., and an oil absorption of 134 g./100 g. was dried at 200° C. over night and added hot to 3000 g. of molten $\epsilon$-caprolactam monomer in a steam-jacketed colloid mill. 300 g. of a paraffin oil having a molecular weight of approximately 175 and a viscosity of 350 S.U. seconds at 23° C., and 15 g. of sodium stearate were also added to the molten monomer and the mixture milled for 10 minutes.

3.6 g. of lithium hydride was added to the resulting monomer suspension and the mixture heated for 3 hours at 99° C. to form a lactam-base salt.

A similar quantity of a second monomer suspension having the same composition as that described above (prior to LiH addition) was prepared as stated and heated to 100° C., and 15 g. of triphenoxytriazine was added thereto.

The monomer suspension containing catlyst, heated to 88° C., and an equal quantity of the monomer suspension containing promoter, heated to 171° C. were pumped into a 3″ diameter tube mold heated to about 168° C. The tube mold was rotated at 800 r.p.m. for 1 hour to form and polymerize the tube.

No residual oil was visible on the resulting polyamide tube, and the tube had a smooth I.D.

EXAMPLE II

The procedure of Example I was repeated with the exception that polymerization was carried out while the tube mold was rotated at 1100 r.p.m. rather than 800 r.p.m.

The cured polyamide tube had a smooth I.D. and the surface was free of residual oil.

EXAMPLE III

The procedure of Example I was repeated with the exception that the paraffin oil was first added to the hot carbon black and the resultant sticky powder was kept overnight under a blanket of nitrogen. The sticky powder was then added to the molten $\epsilon$-caprolactam monomer.

The cured polyamide tube had a smooth I.D. and the surface was free of residual oil.

EXAMPLE IV

The procedure of Example I was repeated with the exception that 210 g. of carbon black was used in each monomer suspension. A smooth-surfaced tube free of surface residual oil was obtained.

EXAMPLE V

The procedure of Example I was repeated using a carbon black having an average particle size of 145 m$\mu$, a surface area of 27 m.$^2$/g., and an oil absorption of 70 g./100 g. A smooth-surfaced tube free of surface residual oil was obtained.

EXAMPLE VI

The procedure of Example I was repeated using a carbon black comprising colloidal size particles having a surface area of 445 m.$^2$/g. and an oil absorption of 150 g./100 g. The polyamide tube obtained was smooth-surfaced and free of surface residual oil.

EXAMPLE VII

A smooth-surfaced polyamide tube free of surface residual oil was obtained using the procedure of Example I, with the exception that the carbon black had an average particle size of 18 mμ, a surface area of 190 m.²/g. and an oil absorption of 225–250 g./100 g., and the oil comprised a paraffin oil having a molecular weight of 145 and a viscosity of approximately 125 S.U. seconds at 23° C.

EXAMPLE VIII

The procedure of Example I was repeated using a carbon black having an average particle size of 18 mμ, a surface area of 190 m.²/g. and an oil absorption of 225–250 g./100 g., and a paraffin oil having a molecular weight of about 200 and a viscosity of 500 S.U. seconds at 38° C. The polyamide tube obtained was smooth-surfaced and free of surface residual oil.

EXAMPLE IX

Using a Gifford-Wood steam jacketed colloid mill, the following mix was prepared.

(1) 1000 gms. of caprolactam monomer containing 3.4 g. triphenoxytriazine promoter
(2) 167 gms. of paraffin oil (M.W. 175; visc. 350 S.U. seconds at 23° C.)
(3) 7 gms. of dried sodium stearate
(4) 40 gms. of high structure furnace black [1] dried at 200° C.

The oil was first emulsified in the monomer and then the carbon black was added to give a somewhat thickened, homogeneous mixture. 660 cc. of this mixture were then added to 220 g. of more monomer containing 0.53 g. lithium hydride catalyst. The two fluids were then mixed, forced into a sheet mold and cured in the conventional manner. The surfaces of the sheet were smooth and free of residual oil.

Because the lubricant is sorbed by the sorbent and the sorbent dispersed through the nylon it is possible, according to this invention, to make strong, solid, substantially non-porous bearings. The lubricant cannot be removed from the bearing even by solvent extraction and it is almost impossible to detect the presence of the lubricant except by measuring the coefficient of friction. Furthermore, the addition of a lubricant permits the nylon to be machined by conventional means at relatively high speeds as opposed to non-lubricated nylons which melt and foul cutting and shaping tools.

Blowing agents can be used to provide the permanently lubricated nylon of this invention with a porous, lightweight structure.

The following examples illustrate the improved PV Values provided by the novel permanently lubricated nylon bearings of this invention.

PV Values are computed for bearing materials to determine their failure point. P is the load on the bearing surface in pounds per square inch. V is the surface velocity of the test specimen in feet per minute. PV Values can be derived by increasing the velocity V at constant pressure P, by increasing the pressure P at constant velocity V, or by increasing both. Failure of the bearing material is evidenced by a rapid increase in temperature of the test specimen (no equilibrium), by rapid wear and/or flaking-off of the surface of the test specimen accompanied by considerable noise.

In the following examples the test specimen comprised a thrust washer 1⅜" in diameter and 1/16" thick, having an annular flange extending about the outer periphery ⅛" wide and extending 1/16" above the surface of the washer. The upper flat surface of this flange having an area of 0.555 in.², comprised the bearing surface.

At each speed the loading on the test specimen was increased stepwise until both the coefficient of friction and the temperature continued to rise without an equilibrium plateau having been established. The product of the surface speed and the next lower test pressure at which equilibrium was established were used in determining the PV Value of the material tested.

EXAMPLE X

Lubricated nylon bearing material having the composition of Example I was cast into the form of a flat sheet 10" x 10" x ½", and a test specimen comprising a a thrust washer having the configuration and dimensions set forth above was cut from this sheet. The PV Value for this material was determined to be 4500.

When the same non-lubricated nylon was subjected to the same test a PV Value of only 850 was obtained. A similarly low PV Value was obtained for another non-lubricated nylon, namely, nylon 6 (PV Value 500).

EXAMPLE XI

The lubricated nylon composition of Example V was cast in the form of a rod 3" in diameter and 6" in length. A test specimen comprising a thrust washer of the configuration and dimensions described above was determined to have a PV Value of 5500.

EXAMPLE XII

The PV Value of the lubricated nylon composition of Example VI was determined to be 6000.

It is to be understood that the form of the invention herein described is to be taken as preferred. Various changes may be made in the compositions and methods disclosed without departing from the scope of this invention.

We claim:

1. A substantially non-porous nylon load bearing body comprising from about 1 to about 35 parts by weight of a lubricant selected from the group consisting of mineral oils, synthetic oils, mineral waxes, and synthetic waxes and from about 0.2 to about 50 parts by weight of colloidal sized particles of a sorbent per 100 parts by weight of nylon, the weight ratio of sorbent to lubricant being in the range between about 1:10 and about 5:1, said lubricant being sorbed by said sorbent, and said sorbent being substantially uniformly dispersed throughout said nylon.

2. The bearing element of said claim 1 in which the nylon is anionically polymerized epsilon caprolactam.

3. The bearing element of claim 2 in which the fluid lubricant is paraffin oil.

4. The bearing element of claim 3 in which the sorbent material is carbon black capable of sorbing from about 20 to about 375 g. oil per 100 g. carbon black.

5. A substantially non-porous nylon load-bearing body comprising from about 3 to about 20 parts by weight of a mineral lubricating oil, and from about 1 to about 20 parts by weight of colloidal size particles of a sorbent per 100 parts by weight of nylon, the weight ratio of sorbent to lubricant being in the range between about 1:5 and about 1.5:1, said lubricating oil being sorbed by said sorbent and said sorbent particles being substantially uniformly dispersed throughout said body.

6. A load-bearing body according to claim 5 wherein said lubricating oil comprises a paraffin oil having a molecular weight of from about 280 to about 700 and a viscosity of from about 10 to about 700 centistokes at 100° F.

7. A load-bearing body according to claim 5 wherein said sorbent comprises carbon black capable of sorbing from about 50 to about 250 g. oil per 100 g. carbon black.

8. The bearing element according to claim 1 in which said sorbent comprises silica.

9. The bearing element according to claim 1 in which said sorbent comprises a mixture of carbon black and silica.

10. The load-bearing body according to claim 5 in which said sorbent comprises silica.

11. The load-bearing body according to claim 5 in

---
[1] Av. particle size 18 mμ; surface area 190 m.²/g.; oil absorption 225–250 g./100 g.

which said sorbent comprises a mixture of silica and carbon black.

References Cited

UNITED STATES PATENTS

| | | | |
|---|---|---|---|
| 1,918,893 | 7/1933 | Beckmann | 252—12.6 |
| 2,246,086 | 6/1941 | Austin | 252—12 |
| 2,698,966 | 1/1955 | Stott et al. | 252—12 |
| 2,849,414 | 8/1958 | Stott | 252—12 |
| 3,017,391 | 1/1962 | Mottus et al. | 260—78 |
| 3,017,392 | 1/1962 | Butler et al. | 260—78 |
| 3,126,339 | 3/1964 | Stott | 252—12 |
| 3,224,967 | 12/1965 | Battista | 252—12.2 |
| 3,252,905 | 5/1966 | Schaeffer | 252—12 |

DANIEL E. WYMAN, *Primary Examiner.*

I. VAUGHN, *Assistant Examiner.*